United States Patent
Phelan et al.

(10) Patent No.: US 7,049,351 B2
(45) Date of Patent: *May 23, 2006

(54) MOLDINGS AND PREPARATION AND USES THEREOF

(75) Inventors: John Christopher Phelan, Gurnee, IL (US); Michael Hugh Quinn, Valparaiso, IN (US)

(73) Assignee: Novartis AG, Basel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/676,332

(22) Filed: Oct. 1, 2003

(65) Prior Publication Data

US 2005/0085561 A1 Apr. 21, 2005

Related U.S. Application Data

(60) Provisional application No. 60/423,289, filed on Nov. 1, 2002.

(51) Int. Cl.
| | |
|---|---|
| *B29B 11/00* | (2006.01) |
| *G02B 1/00* | (2006.01) |
| *G02B 1/04* | (2006.01) |
| *G02B 1/12* | (2006.01) |

(52) U.S. Cl. .................... 523/108; 523/106; 522/84; 522/86; 522/87; 522/88; 522/134; 522/136; 522/144; 522/163; 522/173; 522/175; 522/182; 525/937; 264/1.32; 264/1.36; 264/1.38

(58) Field of Classification Search ................. 522/84, 522/85, 86, 87, 88, 134, 135, 136, 144, 163, 522/173, 175, 182; 523/106–108; 525/937; 264/1.32, 1.36, 1.38

See application file for complete search history.

(56) References Cited

U.S. PATENT DOCUMENTS

| | | | |
|---|---|---|---|
| 3,936,428 A | 2/1976 | Rosenkranz et al. | ........ 260/78.5 |
| 4,060,506 A | 11/1977 | Verbanac | ................... 260/17.4 |
| 5,508,317 A | 4/1996 | Muller | ........................ 522/85 |

FOREIGN PATENT DOCUMENTS

| | | |
|---|---|---|
| DE | 2 334 530 | 1/1974 |
| EP | 57099611 | 6/1982 |
| EP | 0 249 306 | 12/1987 |
| EP | 0 216 074 | 6/1993 |
| WO | WO 02/071106 | 9/2002 |

*Primary Examiner*—James J. Seidleck
*Assistant Examiner*—Sanza L. McClendon

(57) ABSTRACT

An ophthalmic lens made from a crosslinkable polymer containing H-active groups bonded to the oligomer or polymer backbone, some or all of whose hydrogen atoms have been substituted by radicals of a N-hydroxyalkyl (meth) acrylamide. The lens transmits at least 70% of visible light.

31 Claims, 1 Drawing Sheet

MOLDINGS AND PREPARATION AND USES THEREOF

This application claims the benefit under 35 USC §119 (e) of U.S. provisional application No. 60/423,289 filed Nov. 1, 2002, and is incorporated by reference in it's entirety.

The present invention relates to the preparation of biomedical moldings by the crosslinking of water-soluble polymers containing photo-crosslinkable groups in solution. More specifically, the invention relates to the production of contact lenses by crosslinking a water-soluble (meth)acrylamidoalkyl derivative of a hydroxy-containing or amide-containing polymer.

BACKGROUND OF THE INVENTION

Methods of introducing photo-curable groups into polymers, copolymer, and prepolymers are described in the prior art. See, e.g., U.S. Pat. Nos. 5,936,052; 5,508,317; and 2,837,512. In these methods, photo-curable moieties are often incorporated into polymeric materials by tethering acrylate, methacrylate or other types of vinyl groups to the polymers. Nucleophilic reactions involving moisture sensitive functional groups such as epoxy, isocyanate, anhydride, acylhalide or alkylhalide are often employed to attach photo-curable moieties to materials. These moisture sensitive groups serve as links for attaching the vinyl containing reagents to polymers. Either the polymer or the vinyl-functionalizing reagent can contain the nucleophilic groups. Likewise, either the polymer or the functionalizing group can contain the linking groups. However, the presence of moisture sensitive groups in either a polymer or reagent used for functionalizing the polymer limits or prevents the use of water in the reaction solvent.

U.S. Pat. No. 5,508,317 describes a method of introducing vinyl groups into PVA in an aqueous medium. The vinyl groups are attached to the PVA by allowing methacrylamidoacetaldehyde dimethylacetal to react with neighboring hydroxy groups in the PVA. The resulting acetal that links photo-curable groups to the polymer is a six membered ring. Ring forming reactions become kinetically unfavorable as ring size increases. Therefore, if hydroxy groups are spaced too far apart, then incorporation of vinyl groups through acetal formation will be difficult. Acetal formation is also constrained by the relative stereochemistry of hydroxy groups. For example, the relative stereochemistry of neighboring hydroxy groups in many poly(saccharides) is trans. Incorporation of vinyl groups into such materials through acetal chemistry is not favorable.

The acetal forming reactions in systems such as PVA cause the main polymer chain to become part of a ring. Fusing a ring to the main chain of a polymer is known to cause increases in glass transition temperature and decreases in the mobility or flexibility of the main chain. For applications requiring flexible polymer backbones, this is undesirable. Acetal formation can be the result of inter- or intra-molecular reaction of hydroxy groups. Intra-molecular reaction results in the formation of cyclic acetal. In polymeric systems, inter-molecular reactions result in cross-linking upon acetal formation.

Furthermore, many poly(saccharides) are insoluble or poorly soluble in organic solvents. For such systems, the invention disclosed here provides a practical method of introducing photo-curable groups into hydroxy- or amide-containing materials where the above methods would be impractical.

BRIEF SUMMARY OF THE INVENTION

The invention provides a process for the preparation of a substantially aqueous solution of a water-soluble (meth) acrylamidoalkyl derivative of a polymer containing a plurality of H-active groups comprising the steps of:
  a) preparing a substantially aqueous solution of a polymer containing a plurality of H-active groups;
  b) adding an N-hydroxyalkyl (meth)acrylamide and a water-soluble polymerization inhibitor to the solution; and
  c) adding a water-soluble condensation catalyst to the solution to cause a condensation reaction between the hydroxyl groups of the N-hydroxyalkyl (meth)acrylamide and the H-active groups of the polymer.

The invention also provides a process for the manufacture of moldings, especially contact lenses, comprising the following steps:
  a) preparing a substantially aqueous solution of a water-soluble (meth)acrylamidoalkyl derivative of a polymer containing a plurality of H-active groups;
  b) introducing the solution obtained into a mold;
  c) triggering the crosslinking of the polymer by exposure to radiation; and
  d) opening the mold such that the molding can be removed from the mold.

A further embodiment of the invention comprises a contact lens comprising the cross-linked product of a (meth) acrylamidoalkyl derivative of a polymer containing a plurality of H-active groups.

The present invention provides a novel water-soluble composition capable of giving shaped articles having excellent shapeability, surface wetting properties, and transparency. The present invention allows for hydroxy or amide containing polymers to be converted to radiation curable materials without incorporating a polymer main chain into an acetal ring system. In addition, since reaction of N-hydroxyalkyl (meth)acrylamide with hydroxy or amide groups has a 1:1 stiochiometry, premature cross-linking that could occur with acetal chemistry is eliminated.

DETAILED DESCRIPTION OF THE INVENTION

Figure 1:
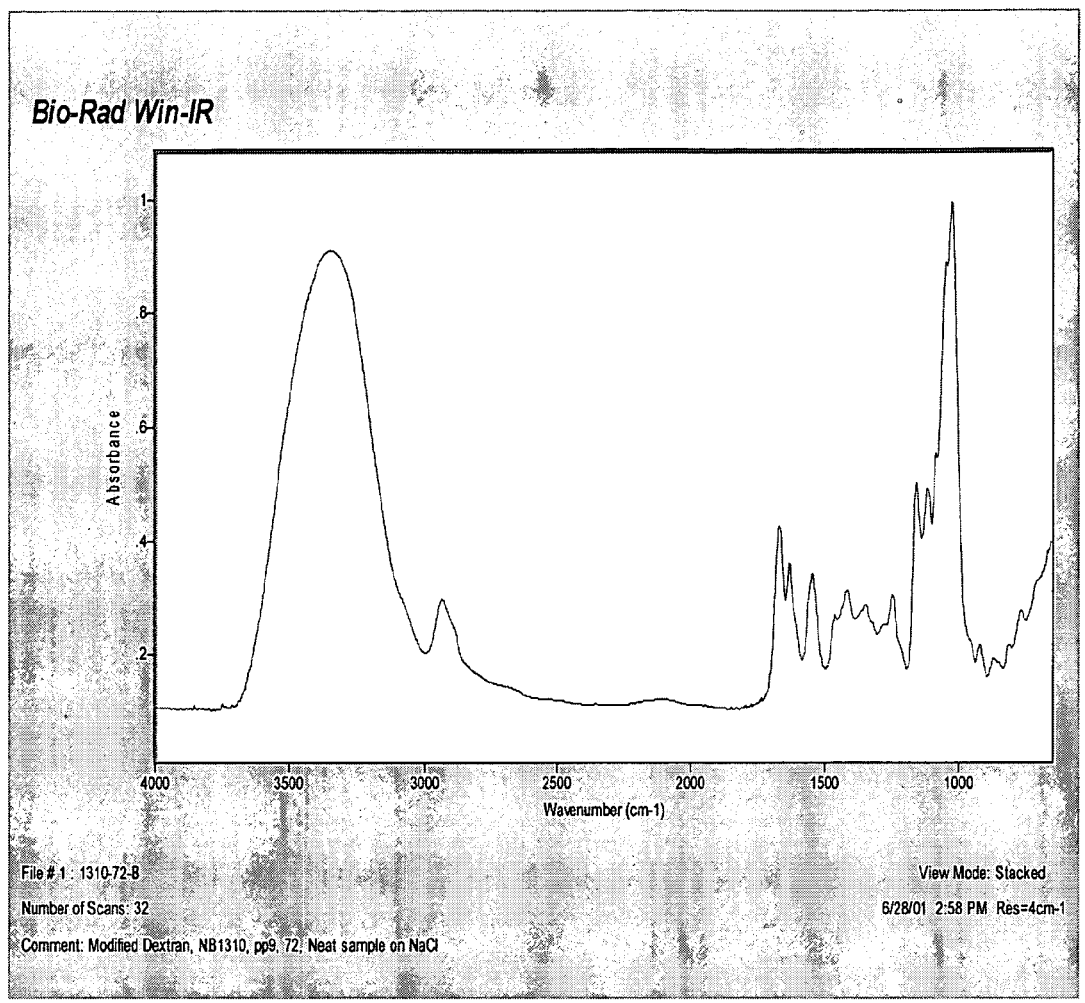
FIG. 1 shows the FT-IR spectrum of dextran after functionalization with N-methylol acrylamide.

In this specification, "(meth)acryl-" means "acryl-" and/or "methacryl-". For example, (meth)acrylamidoalkyl means acrylamidoalkyl and/or methacrylamidoalkyl, and (meth) acrylamide means acrylamide and/or methacrylamide.

The biocompatible prepolymers of this invention are radiation-curable oligomers and polymers containing H-active groups bonded to the oligomer or polymer backbone, some or all of whose H atoms have been substituted by radicals of a N-hydroxyalkyl (meth)acrylamide. The H-active groups are —OH, and/or —NH— groups, with —OH being preferred. The H-active groups may be attached to the polymer in a variety of ways. For example, the H-active groups can be attached to directly (as in PVA) or indirectly (as in poly(acrylamide)) copolymers to the polymer backbone. Acrylamide or dimethylacrylamide (DMA) can be copolymerized with the N-hydroxyalkyl (meth)acrylamide and the pendant H-active group from the N-hydroxyalkyl (meth)acrylamide will be present in the resultant copolymers. The resultant copolymers can then be functionalized with a N-hydroxyalkyl (meth)acrylamide. In addition the N-hydroxyalkyl (meth)acrylamide can be directly attached to poly(acrylamide) copolymers through condensation reactions of poly(acrylamide)amide groups with NHMA. Likewise, among polysaccharides, the —OH group can be attached directly to the sugar ring (as in dextran), or, as in hydroxypropylcellulose, the hydroxyl group of interest can be indirectly attached to the polymer backbone.

The water-soluble polymers that may be modified in accordance with this invention include polysaccharides or polysaccharide derivatives and synthetic polymers. The term "polysaccharide or polysaccharide derivative" is used conventionally herein and refers generally to polysaccharides (i.e., polymers comprised of monosaccharide units linked together by glycosidic bonds) or chemical modifications of polysaccharides which polysaccharides or chemical modifications thereof are soluble in one or more aqueous liquids. By the term "water soluble," it is meant that the polymer is capable of being admixed with water under appropriate temperature and pH conditions such that the resulting mixture appears as a homogeneous liquid under visual inspection with no magnification. Thus, water-soluble polymers may form true solutions in water, colloidal dispersions in water, or emulsions in water. Alternatively, the prepolymer can be a material that is a liquid under ambient physiological conditions. Preferably, the polymer can form a true solution in water.

Particularly suitable polymers are polysaccharides that contain one or more of the following monosaccharide units: arabinose, fructose, galactose, galactopyranosyl, galacturonic acid, guluronic acid, glucuronic acid, glucose, glucoside, N-acetylglucosamine, mannuronic acid, mannose, pyranosyl sulfate, rhamnose, or xylose. Polysaccharides containing the foregoing units include cyclodextrins, starch, hyaluronic acid, deacetylated hyaluronic acid, chitosan, trehalose, cellobiose, maltotriose, maltohexaose, chitohexaose, agarose, chitin 50, amylose, glucans, heparin, xylan, pectin, galactan, glycosaminoglycans, dextran, aminated dextran, cellulose, hydroxyalkylcelluloses, carboxyalkylcelluloses, fucoidan, chondroitin sulfate, sulfate polysaccharides, mucopolysaccharides, gelatin, zein, collagen, alginic acid, agar, carrageean, guar gum, gum arabic, gum ghatti, gum karaya, gum konjak, gum tamarind, gum tara, gum tragacanth, locust bean gum, pectins, and xanthan gum. Polysaccharides that are either anionic or cationic include the natural polysaccharides alginic acid, carrageenan, chitosan (partially deacetylated chitin), gum arabic, gum ghatti, gum karaya, gum tragacanth, pectins, and xanthan gum.

The preferred polysaccharides are dextran, hydroxypropylcellulose, hydroxyethylcellulose, and those comprising glucose monosaccharide units. Dextran is the most preferred polysaccharide.

The solubility of the aforementioned polysaccharides and derivatives thereof is dependent upon a variety of factors including crystalinity, the average degree of polymerization and, in the case of polysaccharide derivatives, the particular substituent and the degree of substitution, i.e., the number of substituent groups per anhydroglucose unit of the polysaccharide molecule. In general, the relative solubility of the polysaccharide in an aqueous liquid increases as the molecular weight decreases. Additionally, a polysaccharide derivative having a low degree of substitution may only be soluble in alkaline aqueous liquid, whereas a polysaccharide derivative having a higher degree of substitution may be soluble in water as well as an alkaline aqueous liquid. The particular substituent and the degree of substitution which imparts the desired solubility to the polysaccharide derivatives are well known in the art and reference is made thereto for the purposes of this invention.

Synthetic polymers containing a plurality of pendent hydroxyl groups are also suitable for use in the present invention. Suitable synthetic hydroxy containing polymers include poly(vinyl alcohol), poly(ethylene glycol), poly(propylene oxide), and PEG-block-PPO, PEG-block-PPO-block-PEG and PPO-block-PEG-block-PPO. Polymers having a plurality of pendent hydroxyl groups can be formed by the polymerization of vinyl esters. The pendent ester groups, when hydrolyzed, form polymers containing pendent hydroxyl groups. A preferred class of polymers having a plurality of pendent hydroxyl groups are based upon hydrolyzed vinyl acetate polymers wherein vinyl acetate is polymerized as a homopolymer or in conjunction with other monomers to form copolymers and are known as poly(vinyl alcohol) or vinyl alcohol copolymers. Polymerization or copolymerizaiton of 2-hydroxyethylmethacrylate (HEMA), glcyerolmethacrylate will yield hydroxy containing polymers or copolymers.

Polyvinyl alcohols that can be derivatized in accordance with the invention preferably have a molecular weight of at least 10,000. As an upper limit the polyvinyl alcohols may have a molecular weight of up to 1,000,000. Preferably, the polyvinyl alcohols have a molecular weight of up to 300,000, especially up to approximately 100,000 and especially preferably up to approximately 50,000.

Amide containing polymers, such as poly(acrylamide) and poly(acrylamide), copolymers can also be converted to radiation curable prepolymers by the present invention.

The preferred polymer is dextran, which is commercially available in a wide variety of molecular weights. Preferably, the dextran has a molecular weight of at least 5,000 Daltons. As an upper limit the dextran may have a molecular weight of up to 1,000,000. Preferably, the dextran has a molecular weight of 5,000 to 500,000, especially from 10,000 to 100,000, and especially preferably up to approximately 50,000.

The functionalizing compound contains a hydroxyl group, an amine group, and a radical-polymerizable acrylic group. Specifically preferred are N-hydroxyalkyl (meth)acrylamides of the general structure:

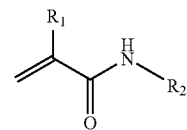

wherein $R_1$ is methyl or —H; $R_2$ is —[(CH$_2$)$_x$—O—]$_y$—H, where x is 1, 2, or 3 and y is 1–5. The preferred $R_1$ is —H. Within $R_2$, x is preferably 1, and y is preferably 1 or 2; most preferably, both x any y are 1.

The preferred N-hydroxyalkyl (meth)acrylamides include, for example, N-2-hydroxylethyl acrylamide, N-2-hydroxyethyl methacrylamide, N-methylol acrylamide, and N-methylol methacrylamide. N-methylol acrylamide is the most preferred functionalizing compound.

Starting with a water-soluble polymer as described above, such materials are modified by reaction with a N-hydroxyalkyl (meth)acrylamide to impart a functionality capable of covalent crosslinking by free radical polymerization. Such free radical polymerization may be initiated by light or other forms of energy using appropriate initiators. Polysaccharides are generally insoluble in organic solvents, thus limiting the ability to modify these materials. One aspect of the present invention involves the modification of these materials by reaction with a N-hydroxyalkyl (meth)acrylamide in a substantially aqueous solution.

To prepare the modified polymer, the concentration of the water-soluble polymer is generally as high as possible to maximize productivity. It is usually above 20% and preferably above 40%. For example, for cellulosic derivatives the concentration is at least 10% by weight and usually at least 20% by weight. For dextrans the concentration is generally at least 20% by weight and preferably between 40 and 60% by weight. The maximum concentration is generally below 80%, usually below 60%, and is dependent upon the viscosity of the resultant dispersion or solution.

Application of heat and/or the addition of a condensation catalyst such as ammonium chloride, or organic acids, such as acetic acid, benzoic acid, or tartaric acid catalyze the functionalization of the starting polymer. Accordingly, the reaction solution preferably comprises a water-soluble condensation catalyst. For the reaction of the starting polymer with a N-hydroxyalkyl (meth)acrylamide, the catalyst is preferably an acid (often an acid generating) catalyst, such as ammonium chloride. The concentration of an acid catalyst in the aqueous phase is generally sufficient to generate a pH of less than 6 and preferably less than 5. For example, the concentration of ammonium chloride is generally at least 0.1% by weight, generally at least 0.5% by weight, and preferably at least 2% by weight.

One of skill in the art will recognize that the degree of substitution or loading of the photo-curable groups onto polymer substrates can be controlled through the concentration and the amount of the N-hydroxyalkyl acrylamide in a reaction solution. The degree of substitution can also be controlled through the reaction temperature, reaction time, and amount of catalyst (e.g. ammonium chloride) used.

Because the N-hydroxyalkyl acrylamide contains an unsaturated group, a polymerization inhibitor should be included in the aqueous solution to prevent premature polymerization of the solution. Because the reaction is carried out in an aqueous solution a water-soluble polymerization inhibitor can be dissolved or dispersed throughout the solution to prevent polymerization and cross-linking reactions during the condensation reaction. These reactions are undesirable since the product is heterogeneous, difficult to isolate, insoluble, and possibly commercially unsatisfactory for the purposes contemplated herein.

The polymerization inhibitor preferably comprises monomethylether hydroquinone (MEHQ) in an amount of at least 1 ppm, preferably more than 50 ppm, often at least 500 ppm, and sometimes greater than 2,000 ppm. Other conventional inhibitors which are compatible with the functionalization reaction may be used in effective amounts. For example, other effective polymerization inhibitors are hydroquinone, paramethoxyphenol, phenylthiazine, copper salts, and methylene blue. If copper (II) is used, it is used in an amount of at least 1 ppm, preferably 5 or 10 ppm, often at least 100 ppm, and sometimes 2,000 ppm or more. The inhibitor may be removed, if necessary, in a subsequent step but may often be left in the product. Copper (II) ions or other metal ions may be removed by contacting an aqueous solution of the product with an ion exchange resin. Alternatively, one could bubble oxygen or air or other mixtures containing oxygen into the reaction mixture to prevent premature polymerization. Oxygen is easily removed from the reaction mixture by known methods.

By way of the above-described process a water-soluble photo-crosslinkable N-hydroxyalkyl (meth)acrylamide functionalized polymer can be obtained. Due to their inherent biocompatibility, physical properties, and optical clarity, the preferred polymers are dextran and polyvinyl alcohol. Dextran is preferably reacted with a N-hydroxyalkyl (meth) acrylamide in the presence of heat and/or ammonium chloride to yield a compound of the following general structure:

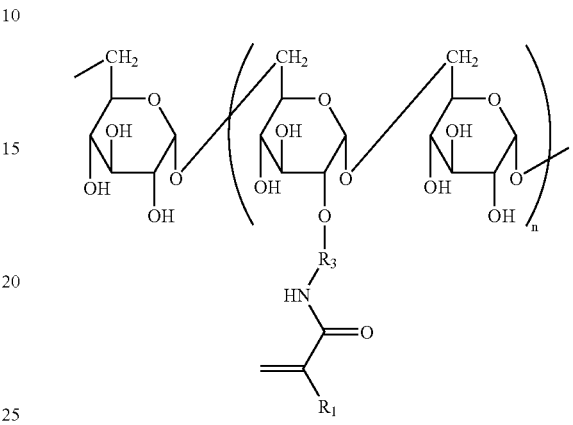

wherein $R_1$ is methyl or —H; and $R_3$ is —$(CH_2)_a$— or —$[(CH_2)_a$—O—$]_b$—, where a is 1, 2, or 3 and b is 1–5. The preferred $R_1$ is —H. $R_3$ is preferably —$(CH_2)_a$—, with a being 1. If $R_3$ is —$[(CH_2)_a$—O—$]_b$—, both b and a are preferably 1.

The preferred prepolymer of the present invention is an acrylamidomethyl derivative of dextran. As discussed and exemplified in more detail below, by way of example, the conversion of dextran to a photo-curable prepolymer through reaction with N-hydroxymethyl acrylamide results in a compound of the general structure:

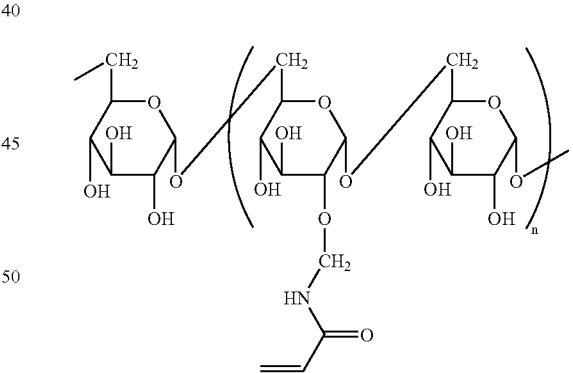

The prepolymers according to the invention can be processed into moldings, especially contact lenses, for example, by carrying out the photocrosslinking of the prepolymers according to the invention in a suitable contact lens mold. The invention is therefore also directed to moldings that comprise a polymer according to the invention. Further examples of moldings according to the invention, besides contact lenses, are biomedical or especially ophthalmic moldings, for example intraocular lenses, eye bandages, moldings that can be used in surgery, such as heart valves, artificial arteries or the like, and also films or membranes, for example membranes for diffusion control, photostructurizable films for information storage, or photoresist materials, for example membranes or moldings for etch resist or screen printing resist.

The present invention therefore relates to a novel process for the manufacture of polymeric moldings, especially contact lenses, in which a water-soluble prepolymer functionalized with N-hydroxyalkyl acrylamide is photo crosslinked in solution, and to moldings, especially contact lenses, obtained in accordance with that process. In the following, those processes are illustrated using the example of contact lenses, but the processes can, however, also be used for other moldings as discussed above. The moldings obtainable in that manner by crosslinking are water-insoluble but are swellable in water.

In detail, the process for the manufacture of moldings, especially contact lenses, comprises the following steps:

a) the preparation of a substantially aqueous solution of a water-soluble (meth)acrylamidoalkyl derivative of a hydroxy-containing polymer, b) the introduction of the solution obtained into a mold, c) the triggering of the crosslinking of the polymer by exposure to radiation, d) opening of the mold such that the molding can be removed from the mold.

The preparation of a substantially aqueous solution of a water-soluble (meth)acrylamidoalkyl derivative of a hydroxy-containing polymer can be carried out in the manner described above, for example by synthesis of the prepolymer in a substantially aqueous solution. Alternatively, it can be prepared by isolation of the prepolymer for example in pure form, which means free from undesired constituents, and dissolution thereof in a substantially aqueous medium.

In accordance with the invention, the prepolymer is soluble in water. Specifically, the prepolymer is soluble in a concentration of approximately from 3 to 90% by weight, preferably approximately from 5 to 60% by weight, especially approximately from 10 to 60% by weight, in a substantially aqueous solution. Insofar as it is possible in an individual case, prepolymer concentrations of more than 90% are also included in accordance with the invention. Especially preferred concentrations of the prepolymer in solution are from approximately 15 to approximately 50% by weight, especially from approximately 15 to approximately 40% by weight, specifically, from approximately 25% to approximately 40% by weight.

Within the scope of this invention, substantially aqueous solutions of the prepolymer comprise solutions of the prepolymer in water or in aqueous salt solutions. Especially preferred are aqueous solutions that have an osmolarity of approximately from 200 to 450 milliosmol per 1000 ml (unit: mOsm/l), preferably an osmolarity of approximately from 250 to 350 mOsm/l, especially approximately 300 mOsm/l, or mixtures of water or aqueous salt solutions with physiologically tolerable polar organic solvents, such as, for example, glycerol.

The aqueous salt solutions are preferably solutions of physiologically tolerable salts, such as buffer salts customary in the field of contact lens care, for example phosphate salts, or isotonizing agents customary in the field of contact lens care, such as, especially, alkali halides, for example sodium chloride, or of mixtures thereof. An example of an especially suitable salt solution is an artificial, preferably buffered, lacrimal fluid that in respect of pH value and osmolarity is adapted to natural lacrimal fluid, for example a sodium chloride solution that is unbuffered or that is preferably buffered, for example, by phosphate buffer, and that has an osmolarity that corresponds to the osmolarity of human lacrimal fluid.

The substantially aqueous solution of the prepolymer defined hereinbefore is preferably a pure solution which means a solution which is free or essentially free from undesired constituents. Especially preferred examples of such solutions are a solution of the prepolymer in pure water or in an artificial lacrimal fluid, as defined hereinbefore.

The viscosity of the solution of the prepolymer in the substantially aqueous solution is, within wide limits, not critical, but the solution should preferably be a flowable solution that can be deformed strain-free.

The molecular weight of the prepolymer is a also, within wide limits, not critical. Preferably, however, the prepolymer has a molecular weight of from approximately 10,000 to approximately 200,000.

The prepolymer used in accordance with the invention preferably comprises N-hydroxyalkyl acrylamido groups in an amount of from an average of approximately 0.5 to approximately 80% equivalents, based on the equivalents of monomers that form the polymeric backbone, especially approximately from 1 to 50%, preferably approximately from 1 to 25%, preferably approximately from 2 to 15% and especially preferably approximately from 3 to 10%. Also especially preferred are amounts of N-hydroxyalkyl acrylamido groups of from approximately 0.5 to approximately 25% equivalents, especially approximately from 1 to 15% and especially preferably approximately from 2 to 12%, based on the equivalents of monomers that form the polymeric backbone.

Preferably, the prepolymer for the process according to the invention is uncrosslinked, or at least substantially uncrosslinked, so that it is water-soluble prior to the exposure of radiation while in the mold.

In addition, the prepolymer is preferably stable in the uncrosslinked state, so that it can be subjected to purification. The prepolymers are preferably used in form of a pure solution in the process according to the invention. Preferably, the prepolymers used in the process according to the invention can be purified in a known manner, for example by precipitation with organic solvents, such as acetone, filtration and washing, extraction in a suitable solvent, dialysis or ultrafiltration, ultrafiltration being especially preferred. By means of that purification process, the prepolymers can be obtained in extremely pure form, for example in the form of concentrated aqueous solutions that are free, or at least substantially free, from reaction products, such as salts, and from starting materials, such as, for example, non-polymeric constituents.

Ultrafiltration is the preferred purification process for the prepolymers and is well known in the art. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the sodium chloride content of the solution, which can be determined simply in known manner.

In a preferred embodiment of the process according to the invention there is prepared in step a) and further used in the process a substantially aqueous solution of the prepolymer that is substantially free from undesired constituents, such as, for example, free from monomeric, oligomeric or polymeric starting compounds used for the preparation of the prepolymer, and/or free from secondary products formed during the preparation of the prepolymer. The substantially aqueous solution is more preferably a pure aqueous solution or a solution in an artificial lacrimal fluid, as defined hereinbefore. It is also preferable to carry out the process according to the invention without the addition of a comonomer, for example a vinylic comonomer. A particular feature of this preferred embodiment of the process according to the invention is therefore that the extraction of undesired constituents following crosslinking can be dispensed with.

One additive that is added, where appropriate, to the solution of the prepolymer is an initiator for the crosslinking, should an initiator be required for crosslinking the crosslinkable groups. That may be the case especially if the crosslinking is carried out by photocrosslinking, which is preferred in the process according to the invention. In the case of photocrosslinking, it is appropriate to add a photoinitiator which can initiate radical crosslinking. Examples thereof are familiar to the person skilled in the art and suitable photoinitiators that may be mentioned specifically are benzoin methyl ether, 1-hydroxycyclohexylphenyl ketone, or a commercial product such as Darocure- or Irgacure types, e.g. Darocure 1173 or Irgacure 2959.

Methods are known in the art for introducing the resulting solution into a mold, such as, conventional metering in, for example by dropwise introductions. Suitable molds are generally customary contact lens molds as known in the state of the art. Thus, the contact lenses according to the invention can be manufactured, for example, in a conventional "spin-casting mold", as described, for example, in U.S. Pat. No. 3,408,429, or by the so-called Full-Mold process in a static mold, as described, for example, in U.S. Pat. No. 4,347,198. Appropriate molds are made from any material known in the art to be suitable for contact lens manufacture. Polypropylene is particularly preferred for cost and reproducibility factors. Alternatively, quartz, sapphire glass, and metals, for example, are suitable materials for re-usable molds.

The crosslinking can be triggered in the mold, for example by actinic radiation, such as, for example, UV light, or by ionizing radiation, such as, for example, gamma radiation, electron radiation or X radiation. Attention is drawn to the fact that the crosslinking can be carried out according to the invention in a very short time, for example in less than five minutes, preferably in less than one minute, especially in up to 30 seconds, especially preferably, as disclosed in the examples.

The mold is opened in such a way that the molding can be removed from the mold. Whereas in processes that have been proposed in the state of the art it is usually necessary at that point for purification steps to follow, for example extraction, and also steps for the hydration of the resulting moldings, especially contact lenses, such steps are not necessary in the process according to the invention.

When employing a functionalized polymer of the present invention in the manufacture of contact lenses, either alone or in conjunction with another polymer, it is important that the resultant lens containing the functionalized polymer be optically transparent. By optically transparent, it is meant that the lens has 70% or more of transmittance of 450 to 700 nm light (visible light). The lens preferably transmits more than 85% of visible light, most preferably greater than 90%. Furthermore, it is preferable that the lens provide good visual acuity when worn and does not significantly scatter light passing through the lens.

The contact lens is a hydrogel with an equilibrium water content of up to 90%, preferably from 10 to 80%, more preferably from 40 to 80%, and most preferably 65 to 75%.

A special embodiment of the invention is directed to contact lenses that comprise a polymer according to the invention or consist substantially or wholly of a polymer according to the invention. Such contact lenses have a wide range of unusual and extremely advantageous properties, which include, for example, their excellent compatibility with the human cornea, which is based on a balanced relationship of water content, oxygen permeability, and mechanical properties. The contact lenses according to the invention furthermore exhibit a high degree of dimensional stability. No changes in shape are detected even after sterilization.

Attention may also be drawn to the fact that the contact lenses according to the invention can be produced in a very simple and efficient manner. This is as a result of several factors. First, the starting materials can be obtained or produced at a favorable cost. Secondly, there is the advantage that the prepolymers are stable, so that they can be subjected to a high degree of purification. It is therefore possible to use for the crosslinking a prepolymer that requires practically no subsequent purification, such as especially a complicated extraction of unpolymerized constituents. Also, the polymerization can be carried out in aqueous solution, so that a subsequent hydration step is not necessary. Finally, the photopolymerization occurs within a short period, so that the process for manufacturing the contact lenses according to the invention can be organized to be extremely economical from that point of view also.

All of the advantages mentioned above naturally apply not only to contact lenses but also to other moldings according to the invention. Taking into account all the various advantageous aspects in the manufacture of the moldings according to the invention it can be seen that the moldings according to the invention are especially suitable as mass-produced articles, such as, for example, contact lenses that are worn for a short time and then replaced by new lenses.

While a molding preferably consists of only one functionalized polymer, a further aspect of this invention provides for moldings comprising two or more additional polymers. The additional polymers can be either non-reactive or can contain functional groups that will react or crosslink with the prepolymer. Non-reactive polymers are incorporated into the crosslinked matrix of the functionalized prepolymer upon exposure to radiation and become an integral part of the lens. While there may possibly be rearrangement and migration of the polymers within the lens due to hydrophobic/hydrophilic interactions the composition of the lens will not change over time during its period of normal use. Examples of suitable non-reactive polymers include poly(vinyl pyrrolidone).

Additional polymers that are reactive with the functionalized prepolymer include polymers having groups that will crosslink with the prepolymer. While, it is preferable that the functional groups of the additional polymers be (meth) acrylamidoalkyl groups, one of skill in the art will recognize that other functional groups will be suitable. The main criterion is that all polymers in the prepolymer mixture are substantially soluble in water. Furthermore, one of ordinary skill will recognize that the blend and concentrations of polymers can be adjusted as to achieve the desired viscosity for the use contemplated.

It has been found that the addition of functionalized poly(vinyl alcohol) in both major and minor amounts to the prepolymers of the present invention improves the physical properties thereof for contact lens use. One particularly preferred functionalized poly(vinyl alcohol) is an acrylate-modified PVA known generically as nelfilcon A. Nelfilcon A can be prepared substantially as described in U.S. Pat. No. 5,508,317 to Müller, incorporated herein by reference.

It has been found that increasing amounts of nelfilcon A material in the prepolymer mixture improves the physical properties of modified dextran for contact lens use. In fact, above approximately 89% nelfilcon in the mixture resulted in the clearest lenses and is therefore, preferred. A surprising benefit of the addition of modified dextran to nelfilcon A was a reduction in viscosity as compared to a nelfilcon solution without the addition of modified dextran.

Accordingly, another aspect of the present provides for the addition of minor amounts of a functionalized polymer according to this invention to crosslinkable polymers, such as nelfilcon A. Such uses of the modified polymers take advantage of their low solution viscosities. (Specifically, solutions of 30% modified dextran have significantly lower solution viscosities than similar nelfilcon A solutions.) Unfortunately, the addition of amounts greater than 15% of modified polymer to nelfilcon result in a lens with diminished physical properties as compared to 100% nelfilcon. However, it has been surprisingly found that nelfilcon solutions including as low as 11% modified dextran will have substantially decreased viscosity, without a concomitant loss of physical properties as compared to a lens made with only nelfilcon. Thus, the addition of a modified polymer according to the present invention can be added to nelfilcon A, or to nelfilcon A with additional high viscosity solutions, to result in a solution that can be used in the manufacturing process of such biomedical moldings.

The invention will now be described in greater detail be reference to the following non-limiting examples.

EXAMPLES

Example 1

Approximately 10 grams of Dextran T5 (MW=5000) was dissolved in about 35 grams of an aqueous solution containing 48 weight percent NHMA. Approximately 0.155 g of MEHQ and 0.2576 grams of ammonium chloride was added to the dextran solution. The mixture heated at about 75° C. After about 16 hours, a few drops of the reaction mixture was poured into acetone. The resulting gummy solid was washed with fresh acetone and analyzed by FT-IR. The IR spectrum showed peaks consistent with successful functionalization of dextran. IR peaks characteristic of OH (from dextran), C=O (amide), and C=C were observed. Pouring the reaction mixture into about 250 mL of acetone precipitated the remainder of the functionalized dextran. The modified dextran was separated from the solvents and allowed to vacuum dry for several days at about 30° C. Approximately 8 grams of a white solid was obtained.

An FT-IR spectrum of dextran after functionalization with NHMA is given in FIG. 1.

Example 2

An aqueous solution containing about 30 weight percent of the modified dextran from Example 1 and about 0.05 weight percent of Irgacure 2959 was used to prepare contact lenses. Lenses were prepared by filling poly(propylene) molds with dextran solution and photo-curing for about 10 seconds at about 2.5 mW/cm². Clear hydrogel lenses with water content of about 76 percent (after sterilization) were obtained.

Example 3

Approximately 40.25 grams dextran T5 (MW=5000) was dissolved in about 140.42 grams of an aqueous solution containing 48 weight percent NHMA. Approximately 0.60 g of MEHQ and 1.04 grams of ammonium chloride were added to the dextran solution. The mixture was heated at about 75° C. After about 24 hours, about 0.5 mL of the reaction mixture poured into 5 mL of acetone. The resulting gummy solid was re-dissolved in water, re-precipitated in acetone and then analyzed by FT-IR. The IR spectrum showed peaks consistent with successful functionalization of dextran. Pouring the reaction mixture into about 700 mL of acetone precipitated the remainder of the functionalized dextran. The modified dextran was separated from the solvents, re-dissolved in about 50 mL of water, and then re-precipitated in about 700 mL of acetone. After drying, approximately 46 grams of modified dextran was obtained.

Example 4

A solution of Nelfilcon containing 11 weight percent of the modified dextran from Example 3 was used to prepare contact lenses. Clear lenses were obtained by curing the blend for 10 seconds under a UV light in poly(propylene) casting cups.

Example 5

Modified dextran was prepared in a manner similar to Example 1, with the exceptions that 40,000 MW dextran was used as the starting polymer and a lower concentration of NHMA was used in the starting solution. This resulted in a decreased degree of vinyl substitution of the dextran. The resultant polymer was combined with IRGACURE 2959 and successfully dissolved in deionized water to yield a solution 30% by weight modified dextran and 0.08% by weight IRGACURE 2959.

Example 6

Modified dextran was prepared in a manner similar to Example 1, with the exception that 40,000 MW dextran was used as the starting polymer. The resultant polymer was combined with IRGACURE 2959 and successfully dissolved in deionized water to yield a solution 30% by weight modified dextran and 0.08% by weight IRGACURE 2959.

Example 7

Modified dextran was prepared in a manner similar to Example 1, with the exception that a lower concentration of NHMA was used in the starting solution. This resulted in a decreased degree of vinyl substitution of the dextran. The resultant polymer was combined with IRGACURE 2959 and successfully dissolved in deionized water to yield a solution 30% by weight modified dextran and 0.08% by weight IRGACURE 2959.

Example 8

The modified dextran of Example 1 combined with IRGACURE 2959 and successfully dissolved in deionized water to yield a solution 30% by weight modified dextran and 0.08% by weight IRGACURE 2959.

Examples 9–14

Lenses were made by polymerizing the mixtures of Table 1 under UV illumination for about 9 seconds, irradiation 1.9 mWcm$^{-2}$ in polypropylene casting cups. The lenses were demolded by placing the casting cups containing the lens in deionized water. The lenses had varying yields (% lenses sucessfully demolded), with lenses with lower amounts of dextran having higher yields. Following demolding, the physical properties of the lenses were measured and are put forth in Table 2. Tensile properties are reported as average values and as maximum values. The maximum values are provided as the lens making process is not optimized and the maximum values give a better indication of the potential of the polymers in an optimized production process.

TABLE 1

| Example | Nelfilcon (%) | Dextran of Example 5 (%) | Dextran of Example 6 (%) | Dextran of Example 7 (%) | Dextran of Example 8 (%) |
|---|---|---|---|---|---|
| 9 | 95 | — | — | 5 | — |
| 10 | 94 | 6 | — | — | — |
| 11 | 80 | 20 | — | — | — |
| 12 | 95 | — | 5 | — | — |
| 13 | 95 | — | — | — | 5 |
| 14 | 94 | — | — | — | 6 |

The lenses were visually inspected and a subjective clarity was assigned on a scale of 1–5; with 1 being clear and 5 being hazy. Lenses of Examples 9, 10, and 12–15 had a clarity of 1, while the lens of Example 11 had a clarity of 2.

TABLE 2

| Example | Break Stress (N/mm$^2$) Average | Break Stress (N/mm$^2$) Maximum | Elongation at Break (%) Average | Elongation at Break (%) Maximum | Modulus (N/mm$^2$) |
|---|---|---|---|---|---|
| 9 | 1.206 | 1.558 | 199 | 245 | 0.594 |
| 10 | 0.860 | 1.241 | 153 | 239 | 0.599 |
| 11 | 0.576 | 0.619 | 107 | 113 | 0.618 |
| 12 | 1.152 | 1.496 | 187 | 224 | 0.641 |
| 13 | 1.068 | 1.546 | 180 | 235 | 0.581 |
| 14 | 1.095 | 1.443 | 186 | 256 | 0.594 |

The examples demonstrate the usefulness of the N-hydroxyalkyl (meth)acrylamide derivatives in the manufacture of biomaterials, especially contact lenses. While the invention has been described in detail with reference to certain preferred embodiments thereof, it will be understood that modifications and variations are within the spirit and scope of that which is described and claimed.

We claim:

1. An ophthalmic lens comprising the cross-linked product of a first polymer, wherein said first polymer is a radiation-curable (meth)acrylamidoalkyl derivative of an oligomer or polymer containing a plurality of H-active groups, wherein said lens transmits at least 70% of visible light.

2. A lens as claimed in claim 1, wherein said H-active groups are selected from the group consisting of —NH$_2$ groups and —OH groups.

3. A lens as claimed in claim 1, wherein said (meth)acrylamidoalkyl derivative is obtained by substituting at least one hydrogen atom in H-active groups of the oligomer or polymer with radicals of a N-hydroxyalkyl (meth)acrylamide of the structure

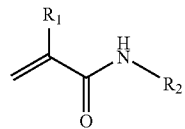

wherein R$_1$ is methyl or —H; R$_2$ is —[(CH$_2$)$_x$—O—]$_y$—H, where x is 1, 2, or 3 and y is 1–5.

4. A lens as claimed in claim 3, wherein R$_1$ is —H, x is 1 or 2, and y is 1 or 2.

5. A lens as claimed in claim 4, wherein the N-hydroxyalkyl (meth)acrylamide is selected from the group consisting of N-2-hydroxylethyl acrylamide, N-2-hydroxyethyl methacrylamide, N-methylol acrylamide, and N-methylol methacrylamide.

6. A lens as claimed in claim 1, wherein said lens has a water content between 40% and 80%.

7. A lens as claimed in claim 2, wherein said first polymer is selected from the group consisting of polysaccharides, polysaccharide derivatives, poly(vinyl alcohol), poly(ethylene glycol), poly(propylene oxide), PEG-block-PPO, poly(acrylamide) poly(acrylamide), and copolymers thereof.

8. A lens as claimed in claim 7, wherein said first polymer is selected from the group consisting of polysaccharides and polysaccharide derivatives.

9. A lens as claimed in claim 8, wherein said first polymer is selected from the group consisting of dextran, hydroxypropylcellulose, hydroxyethylcellulose, and polysaccharides comprising glucose monosaccharide units.

10. A lens as claimed in claim 8, wherein said first polymer is selected from the group consisting of water-soluble polysaccharides and water-soluble polysaccharide derivatives.

11. A lens as claimed in claim 1, wherein said first polymer is dextran and said N-hydroxyalkyl (meth)acrylamide is N-methylol acrylamide.

12. A lens as claimed in claim 1, wherein said first polymer is soluble in water before it is crosslinked, and swellable in water after it is crosslinked.

13. A lens as claimed in claim 1, further comprising the crosslinked product of a second polymer, wherein said second polymer is a water-soluble crosslinkable polymer.

14. A lens as claimed in claim 13, wherein said second polymer is nelfilcon A.

15. A lens as claimed in claim 14, wherein said nelfilcon A is present in the lens in an amount greater than said first polymer.

16. A method for making a contact lens material comprising the steps of:
   a) preparing a substantially aqueous solution of a polymer containing a plurality of H-active groups;
   b) adding an N-hydroxyalkyl (meth)acrylamide and a water-soluble polymerization inhibitor to the solution; and
   c) adding a water-soluble condensation catalyst to the solution to cause a condensation reaction between the hydroxyl groups of the N-hydroxyalkyl (meth)acrylamide and the H-active groups of the polymer.

17. A method for making a molding comprising the following steps:
   a) preparing a substantially aqueous solution of a first polymer, wherein said first polymer is a radiation-curable (meth)acrylamidoalkyl derivative of an oligomer or polymer containing a plurality of H-active groups;
b) introducing the solution obtained into a mold;
c) exposing the polymer to radiation to crosslink the polymer; and
d) opening the mold such that the molding can be removed from the mold.

18. A method as claimed in claim 17, wherein said H-active groups are selected from the group consisting of —$NH_2$ groups and —OH groups.

19. A method as claimed in claim 17, wherein said (meth)acrylamidoalkyl derivative is obtained by substituting at least one hydrogen atom in H-active groups of the oligomer or polymer with radicals of a N-hydroxyalkyl (meth)acrylamide of the structure

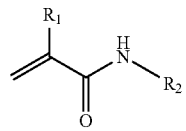

wherein $R_1$ is methyl or —H; $R_2$ is —$[(CH_2)_x$—O—$]_y$H, where x is 1, 2, or 3 and y is 1–5.

20. A method as claimed in claim 19, wherein $R_1$ is —H, x is 1, and y is 1.

21. A method as claimed in claim 20, wherein the N-hydroxyalkyl (meth)acrylamide is selected from the group consisting of N-2-hydroxylethyl acrylamide, N-2-hydroxyethyl methacrylamide, N-methylol acrylamide, and N-methylol methacrylamide.

22. A method as claimed in claim 17, wherein said lens has a water content between 40% and 80%.

23. A method as claimed in claim 18, wherein said first polymer is selected from the group consisting of polysaccharides, polysaccharide derivatives, poly(vinyl alcohol), poly(ethylene glycol), poly(propylene oxide), PEG-block-PPO, poly(acrylamide) poly(acrylamide), and copolymers thereof.

24. A method as claimed in claim 23, wherein said first polymer is selected from the group consisting of polysaccharides and polysaccharide derivatives.

25. A method as claimed in claim 24, wherein said first polymer is selected from the group consisting of dextran, hydroxypropylcellulose, hydroxyethylcellulose, and polysaccharides comprising glucose monosaccharide units.

26. A method as claimed in claim 24, wherein said first polymer is selected from the group consisting of water-soluble polysaccharides and water-soluble polysaccharide derivatives.

27. A method as claimed in claim 17, wherein said first polymer is dextran and said N-hydroxyalkyl (meth)acrylamide is N-methylol acrylamide.

28. A method as claimed in claim 17, wherein said first polymer is soluble in water before it is crosslinked, and swellable in water after it is crosslinked.

29. A method as claimed in claim 17, wherein said solution further comprises second polymer, wherein said second polymer is a water-soluble crosslinkable polymer.

30. A method as claimed in claim 29, wherein said second polymer is nelfilcon A.

31. A method as claimed in claim 30, wherein said nelfilcon A is present in the lens in an amount greater than said first polymer.

* * * * *